US006243765B1

(12) United States Patent
Raab et al.

(10) Patent No.: US 6,243,765 B1
(45) Date of Patent: Jun. 5, 2001

(54) METHOD AND APPARATUS FOR DATA COMMUNICATION

(75) Inventors: Ilan Raab, Sunnyvale; Edward G. Richardson, San Jose; Allan Thomson, Palo Alto, all of CA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/962,221

(22) Filed: Oct. 31, 1997

Related U.S. Application Data

(63) Continuation of application No. 08/235,158, filed on Apr. 28, 1994, now abandoned.

(51) Int. Cl.[7] .................................................. G06F 9/00
(52) U.S. Cl. ............................................................. 709/316
(58) Field of Search ........................... 395/680, 200.75, 395/200.66, 683; 709/303, 300, 219, 218, 217, 203, 202, 201, 200, 329, 328, 319, 310, 316, 315

(56) References Cited

U.S. PATENT DOCUMENTS

| | | | |
|---|---|---|---|
| 4,994,998 | * 2/1991 | Anezaki | 395/751 |
| 5,339,430 | * 8/1994 | Lundin | 395/700 |
| 5,410,695 | * 4/1995 | Frey et al. | 395/680 |
| 5,421,015 | * 5/1995 | Khoyi | 395/650 |
| 5,428,782 | * 6/1995 | White | 395/650 |
| 5,454,102 | * 9/1995 | Tang et al. | 707/3 |
| 5,465,359 | * 11/1995 | Allen et al. | 395/671 |
| 5,862,377 | * 1/1999 | Lee | 709/300 |

OTHER PUBLICATIONS

Bilgic, Murat, & Behcet Sarikaya, "Performance comparison of ASN.1 encoder/decoders using FTAM", Computer Communications, v16, n4, p229(12), Apr. 1993.*

Koivisto, Juha, James Reilly, "Generating Object–Oriented Telecommunications Software using ASN.1 Descriptions", Upper Layer Protocols, Architectures and Applications, pp. 133–147, 1992.*

"Distributed Data Management Level 1.0 Architecture Implementation Planner's Guide," International Business Machines Corporation, First Edition, Jun. 1986.

"Using Distributed Data Management for the IBM Personal Computer," International Business Machines Corporation, First Edition, May 1987.

(List continued on next page.)

Primary Examiner—Alvin E. Oberley
Assistant Examiner—St. John Courtenay, III
(74) Attorney, Agent, or Firm—Blakely Sokoloff Taylor & Zafman LLP

(57) ABSTRACT

A method and apparatus for communicating information. In particular, a method of communicating data between a plurality of applications, comprising the following steps. A first list is encoded. The first encoded list includes a first set of data objects. Each of the data objects includes data to be communicated. Next, the first encoded list is transmitted to a first of the plurality of applications and decoded for the first application. The first application accesses a first subset of data objects from the first encoded list. The first subset of data objects does not necessarily include all data objects in the first set of data objects. Next, the first application generates a second encoded list, where the second encoded list corresponds to the first encoded list. Then, the first application causes the second encoded list to be transmitted to a second application and decoded for the second application. The second application then accesses a second subset of data objects corresponding to the second encoded list, the second subset of data objects not necessarily including the same data objects in the first subset of data objects. The first application and the second of the plurality of applications exchange data type information for the second subset of data objects corresponding to the second encoded list.

43 Claims, 6 Drawing Sheets

OTHER PUBLICATIONS

"Distributed Data Management Architecture Implementation Programmer's Guide Level 4," International Business Machines Corporation, Fifth Edition, Sep. 1993.

"Distributed Data Management Architecture: General Information Level 4," International Business Machines Corporation, Fourth Edition, Mar. 1993.

"Distributed Data Management (DDM) DDM Architecture Referene Manual Level 4," International Business Machines Corporation, Sep. 1993.

Norr, Henry, "Frontier opens program links", MacWeek, v6, n2, p1(2), Jan. 1992.*

IBM, Distributed Data Management For the IBM Personal Computer, Nov. 17, 1993 IBM, Implementation Planner's Guide, First Edition, 6/86.

IBM, Distributed Data Management Architecture: General Information, Fourth Edition, 3/93.

IBM, Distributed Data Management DDM Architecture: Implementation Programmer's Guide Fifth Edition, 9/93.

IBM, Distributed Data Management:DDM Architecture Reference Manual, vol. 1, Jul. 21, 1993.

IBM, Distributed Data Management:DDM Architecture Reference Manual, vol. 2, Jul. 21, 1993.

IBM, Distributed Data Management:DDM Architecture Reference Manual, vol. 3, Jul. 21, 1993.

An Introduction to Operating Systems, *Harvey M. Deitel*, Second Edition 1990.

Computer Systems Architecture, *Jean–Loup Baer*, Computer Science Press 1980.

Object Oriented Design with Applications, *Grady Booch*, The Benjamin/Cummings Publishing Company, Inc. 1991.

* cited by examiner

METHOD AND APPARATUS FOR DATA COMMUNICATION

This United States Patent Application filed by inventors Ilan Raab, Edward Richardson, and Allan Thomson is a continuation of now abandoned U.S. patent application Ser. No. 08/235,158, entitled "A METHOD AND APPARATUS FOR DATA COMMUNICATION", filed by Ilan Raab, Edward Richardson, and Allan Thomson on Apr. 28, 1994 and claims the benefit thereof.

BACKGROUND OF THE INVENTION

1. Field of the Invention

The present invention relates to the field of data communication. In particular, the present invention describes a method and apparatus for communicating data, where the data is communicated independent of the platform, and the data is self describing.

2. Description of Related Art

In early computer systems, programs were executed sequentially. The instructions for a first program would be read into a large mainframe and the result would be computed. Then another program's instructions would be read into the computer and those results would be computed. Now, computer systems can run a number of programs, appearing to the user to be executing simultaneously. This concept has even evolved to the use of networks where one computer is running one application while another computer networked to the first computer runs a second application. To improve performance of modern computer systems, it is desirable for the computers to be able to communicate information between the various programs (applications).

In previous systems, one application would be written to be able to communicate data with a second application. For example, if two applications wanted to share information, the first application would be designed to include a number of variables that the second application would understand. Data could then be inserted in the variables and transmitted from the first application to the second application. The second application would have been written to understand these variables and to extract the information from them. Thus, two applications could communicate. However, as computer systems and the networks they run on get larger and larger, the number of applications needing to share information has grown substantially. For example, it's conceivable to have a thousand applications running on 500 computer systems, all of those applications then needing to share information. Some applications are likely to be of an earlier version, than others. New applications will be added, having new functions and needing to share more and different information. Some applications will only know how to communicate with only a few of the other applications. However, it is desirable that all the applications would be able to share at least some data with each other.

One possible solution to this problem has been to define a very small set of known data components. For example, in Simple Network Management Protocol, IETF Request For Comments (RFC) 1067 (SNMP), two applications must know all the data components that are to be shared between the two applications. For example, if a first application transmits the time and date and a file name to a second application, the second application would have to have been written to understand that the time and date and the file name would be received from a first application. Further in some protocols, the ordering of the data being transmitted was critical. For example, the first application might send the time, date and file name in that order and the second application would understand that the first piece of information would be the time, the next piece of information would be the date, and the next piece of information would be the file name. If the authors of the first application wished to change this order, or to add a new variable to the information, the second application would also have to be rewritten to incorporate these changes. Thus what is needed is a system where the data to be transmitted is not ordered, that is not necessarily predefined, and in particular, allows older versions of applications exchange information with newer versions of applications.

Another prior art system is available from International Business Machines, of New York. IBM has created a distributed data management (DDM™) system to transmit information from one computer system to another computer system in a heterogeneous network. DDM, for example, allows a personal computer to communicate file data with a mainframe. A personal computer will send a request for information containing a list of objects. The list might include, for example, a file name, a record number and file type. The list can contain any number of objects in any order. Prior to exchanging any requests for data, the DDM applications must first negotiate what level of service will be provided. For example, at the lowest level, relatively basic information can be exchanged. If the mainframe application and the PC application both support a higher level of DDM implementation, then more information can be exchanged. For example, relational database access may be provided by the mainframe at a higher level of DDM support.

DDM has a number of shortcomings. First, DDM supports only point-to-point communications, that is, a request for information sent by the PC to the mainframe cannot then be used by another level of the implementation on, for example, a second PC. Thus, if the PC implements level two of DDM, the mainframe implements level one and a second PC implements level two, the first PC can only exchange level one information with the mainframe. The first PC would not be able to communicate level two information to the second PC without directly communicating with the second PC. A second shortcoming related to DDM, is that a level one, or earlier version application, cannot accept objects related to a higher level application. Therefore, for example, assume two PCs are in communication. The first PC runs a level one implementation and the second PC runs a level two implementation. The following problem occurs. If the second application did not negotiate the levels prior to attempting to transmit information to the first application, the second application would not understand that the first application only implements level one. That is, a request from the second application may include data objects that are not supported by the first application. DDM requires that the first application transmit a reply a message that that object is not supported.

Therefore, what is required is a system that allows applications to share data easily and efficiently. The system should be extensible, and should not require prior negotiation of data interfaces. The system should be able to work on a single computer executing a number of applications, as well as, on a number of computers running a number of applications. It is also desirable to have a system which allows a number of different versions of a single application to continue to communicate with other versions of that application.

SUMMARY OF THE INVENTION

A method and apparatus for easily communicating information is described. In one embodiment, OCL (Object Control Language) data classes support flexible data types and structures useful in a variety of applications. OCL provides a general and extensible format for exchanging data between applications. The data can be exchanged without requiring applications to predefine data types, templates or transport mechanisms used for exchanging data. OCL data is self contained. Receiving applications need process only the data that the application is interested in, other data can be ignored. The use of dynamic property lists as the basic structure of exchange provides an easy path to extendibility. New, or updated applications, may add additional elements to exchanged data, without affecting previous applications, which do not need the additional element. For data exchange, OCLLIST instances are encoded into architecture-neutral binary streams at the sending end and are decoded back into OCLLIST instances at the receiving end.

One embodiment, of the present invention, includes a method of communicating data between a plurality of applications. First a list is encoded. The list includes a first set of data objects. Each of the data objects includes data to be communicated. Next, the encoded list is transmitted to a first of said plurality of applications. Then the encoded list is decoded for a first application. However, the first application and a second of said plurality of applications do not exchange data type information prior to performing the following steps. The first application accesses a first subset of data objects from the list. The first subset does not include all data objects in the first set. Next, generate a second encoded list, where the second encoded list corresponding to the list. Then, the first application causes the second encoded list to be transmitted to the second application. The second encoded list is decoded for said second application. Finally, the second application accesses a second subset of data objects corresponding to the list, the second subset not including all the data objects in the first subset.

In another embodiment, decoding the encoded list for said first application is performed by a third application.

In another embodiment, the first application and the second application are executing on a first computer. In this embodiment, decoding the encoded list for the second application can be performed by the third application.

In another embodiment, the first application is executing on a first computer, and the second application is executing on a second computer, and the first computer is coupled in communications with the second computer. In this embodiment, decoding the encoded list for the second application is performed by a fourth application, the fourth application executing on the second computer.

In another embodiment, the list includes an OCLLIST, and each data object includes an OCLSYMBOL and an OCLVAR.

In another embodiment, the first application is an earlier version of the second application.

In another embodiment of the present invention, an apparatus performs the above functions.

Although a great deal of detail has been included in the description and figures, the invention is defined by the scope of the claims. Only limitations found in those claims apply to the invention.

BRIEF DESCRIPTION OF THE DRAWINGS

The present invention is illustrated by way of example, and not limitation, in the figures. Like references indicate similar elements.

DESCRIPTION OF THE PREFERRED EMBODIMENT

Overview

A method and apparatus for easily communicating information is described. In this description, the general computer system upon which the present invention can be implement is described. Next, the general Object Control Language (OCL) data model used to communicate information is described. OCL provides the foundation for the many advantages achieved in the various embodiments of the present invention. The remaining portions of the description provide details as to the use of OCL.

In the following description, numerous specific details are set forth such as OCLVAR, OCLLIST, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Computer System Overview

Figure 1:
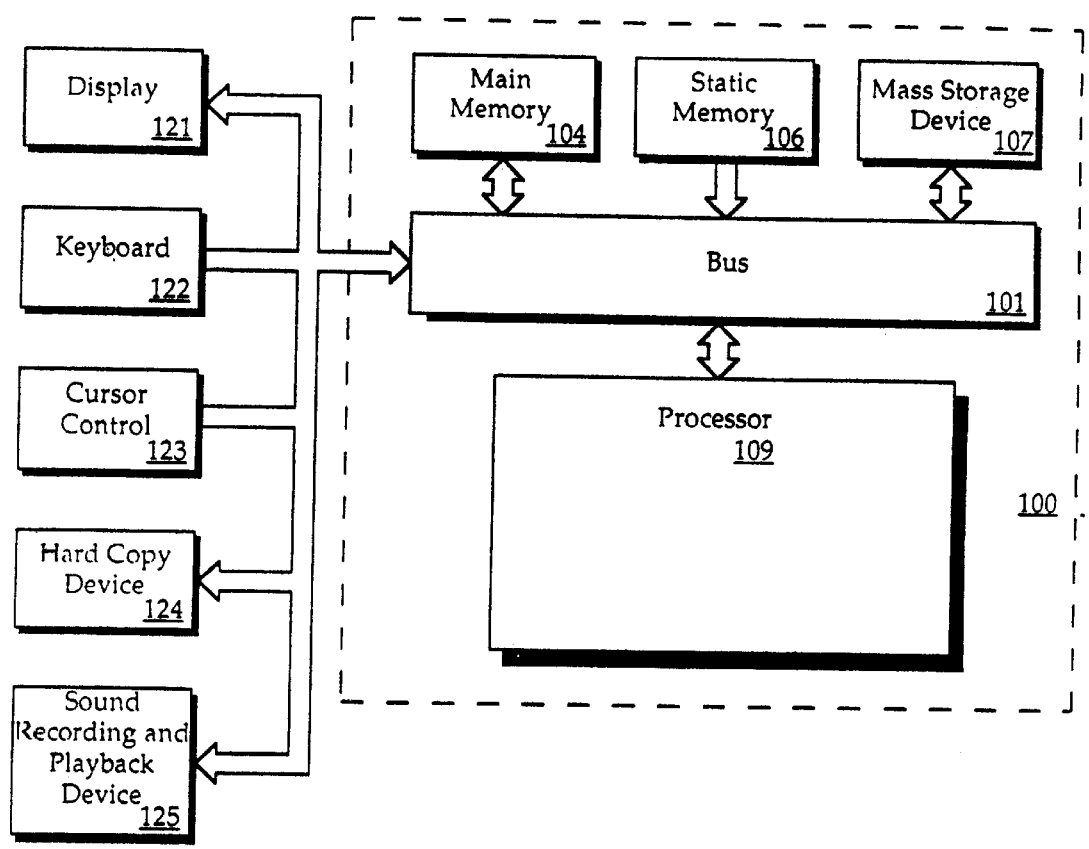
FIG. 1 illustrates a computer system upon which the present invention can be implemented.

Referring to FIG. 1, the computer system upon which an embodiment of the present invention can be implemented is shown as 100. Computer system 100 comprises a bus 101, or other communications hardware and software, for communicating information, and a processor 109 coupled with bus 101 for processing information. System 100 further comprises a random access memory (RAM) or other dynamic storage device 104 (referred to as main memory), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds. Finally, computer system 100 can be a terminal in a computer network (e.g., a LAN).

Object Control Language (OCL) Data Class Hierarchy

One embodiment of the present invention employs the Object Control Language data model as the foundation for providing communications between applications. Using object oriented techniques, OCL allows applications to communicate simply and efficiently. OCL allows applications, having different versions, to share information, and pass information on to other applications, without the loss of data. OCL does not require that older versions of applications be updated before they can share information with newer versions of applications.

Object oriented techniques are well known. For example, DDM uses an object oriented approach. Traditional programming techniques rely on operations to perform functions on operands. The operations are the active part of the language. The operands are the passive part of the language. That is, operands are changed when operations act on them. In object oriented languages, operations and operands are replaced with objects. Each object understands commands, also known as methods. Each object contains both data and methods of manipulating that data. Commands are used to request an object to access its data. For example, a list object typically includes data representing a list of other objects. Another object may request the list object to provide the first object in its list. The list object receives the request, processes the request and provides the first object in its list.

Objects belong to classes. Each object is representative of some class, for example a list object is an instance of a List class. A class defines the commands that an object understands.

Class inheritance is also known and is used in OCL. Every new OCL class is a subclass of some other OCL class. The subclass has all the same data and understands all the commands of its superclass. The subclass can also add additional data and commands.

In one embodiment of the present invention, OCL is implemented in C++. However, other languages could be used to implement OCL, for example, Smalltalk, Objective C and LISP. Generally, any language that allows treating various OCL classes identically can be used to implement OCL.

Figure 2:
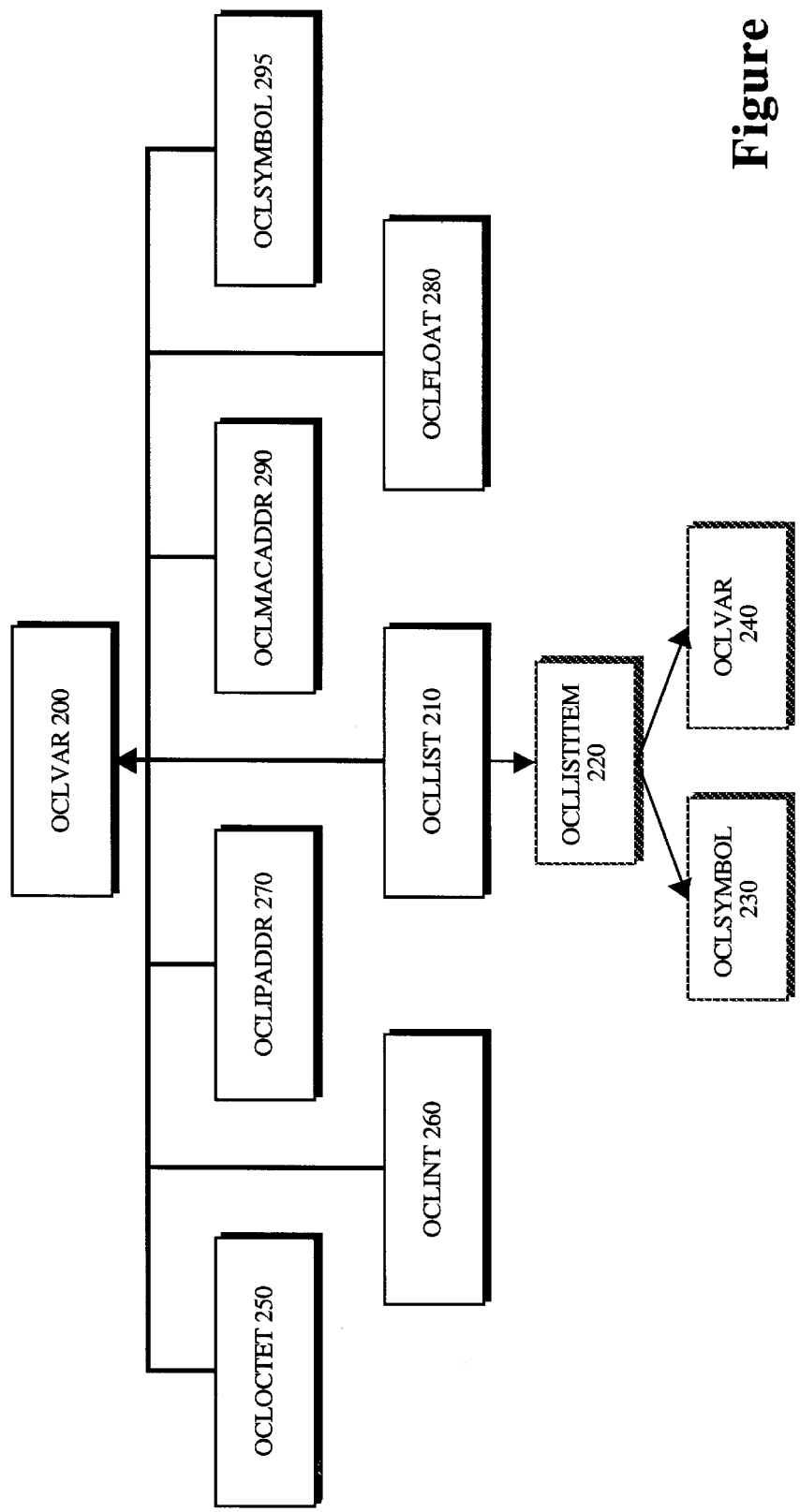
FIG. 2 illustrates the Object Control Language (OCL) data class hierarchy.

FIG. 2 illustrates the Object Control Language (OCL) data class hierarchy. OCLVAR 200 is a base class. This means that it is not a subclass of any other class. OCLOCTET 250, OCLINT 260, OCLIPADDR 270, OCLFLOAT 280, OCLMACADDR 290, OCLSYMBOL 295, and OCLLIST 210 are classes. Each of these classes are subclasses of OCLVAR 200. This relationship is shown as a thick line. OCLLISTITEM instance 220 is related to OCLLIST 210 by a thin line, indicating that an OCLLIST 210 instance may contain zero or more OCLLISTITEM instances. A property list consists of one or more property-value pairs. Each pair consists of a property, (attribute), name and its associated value.

Like OCLVAR, the OCLLISTITEM class, is a base class of the OCL list class hierarchy which is not shown in FIG. 2. Each OCLLISTITEM instance 220 represents a property-value pair. Each pair consists of a property, (attribute) name and its associated value. Each OCLLISTITEM instance 220 contains one OCLSYMBOL instance 230 and one OCLVAR instance 240 (or an instance of a subclass of OCLVAR 200 subclass). For example, an OCLLISTITEM instance 220 can contain a OCLSYMBOL instance 230 and an instance of an OCLIPADDR 270. Another example illustrates the recursive nature of OCL. An OCLLIST 210 instance can contain an OCLLISTITEM instance 220. That OCLLISTITEM instance 220 can contain an OCLSYMBOL instance 230 and a second OCLLIST instance. Further, the second OCLLIST instance can contain other OCLLIST instances.

In one embodiment, the subclasses of OCLVAR 200 are defined as follows. OCLOCTET 250 represents octet strings in the OCLVAR class hierarchy. An octet string is a string of 8-bit values. OCLINT 260 represents integers. OCLINT values are 32-bit signed integers. OCLIPADDR 270 represents IP address values. IP addresses are described in IETF RFC 791. OCLFLOAT 280 represents floating point values. OCLFLOAT values are C float type, 32-bit single precision. OCLMACADDR 290 represents MAC address values. Section 5.2 of the IEEE standard, IEEE Std. 802-1990, defines MAC address and their respective values. A MAC address consists of 6 pairs of hexadecimal digits to create a 48-bit (6 byte) address. In one embodiment, the syntax of MAC addresses or the constructor string may optionally include colons separating the pairs of hexadecimal digits. OCLSYMBOL 295 represents character strings. An OCISYMBOL character string is zero terminated. Of course, one of ordinary skill in the art would understand that variations of these OCL classes subclasses could be used without diverging from the scope of the invention. For example, OCLINT 260 could represent 64-bit unsigned integers, OCLSYMBOL 295 could be represented by having its character strings without a zero termination.

A Method of Communicating Data Between Applications

Figure 3:
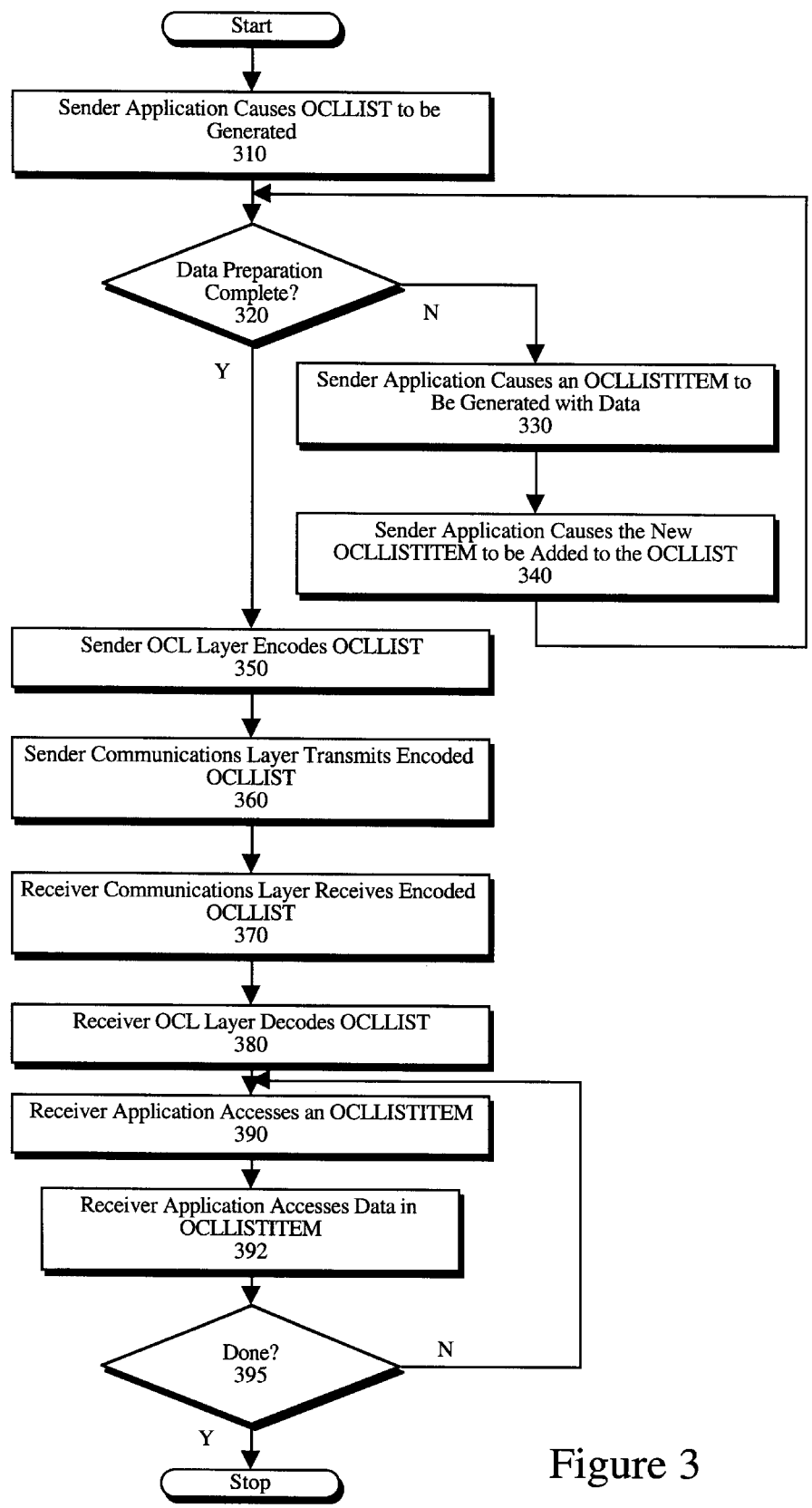
FIG. 3 is a flowchart illustrating a method of communicating data between applications.

FIG. 3 illustrates a method of communicating data between applications using an OCLLIST. This method allows two applications to share information without prior definition of the data types, templates or transport mechanism.

At step 320, the sending application causes an OCLLIST instance to be generated. Typically, this is done by sending a request to an OCL library. The OCL library is compiled as part of each application that uses it. The OCL library returns an instance of an OCLLIST to the sending application. At step 320, the sending application determines whether it has included all the data in the OCLLIST instance. If more data needs to be added, before sending the list, steps 330 and 340 are executed. At step 330, the sending application causes an OCLLISTITEM instance to be generated with the data to be added to the OCLLIST instance. As with the OCLLIST instance, a message is typically sent to an OCL library requesting a new OCLLISTITEM instance. At step 340, the sending application causes the new OCLLISTITEM instance to be added to the OCLLIST instance. Step 320 tests whether more information needs to be added.

If all the information has been added to the list, then at step 350, an OCL layer encodes the OCLLIST instance. The encoding of an OCLLIST instance is discussed in greater detail with respect to FIGS. 4a and 4b. The OCL layer is part of the communications system. Applications, executing in the application layer, make requests of the OCL layer. Among other things, the OCL layer provides instances, encodes data, and causes encoded data to be transmitted via the communication system's communications layer. These layers are discussed in greater detail in relation to FIG. 5. By encoding the OCLLIST instance, a byte stream representation is created.

At step 360, the communications layer, associated with the sending application, transmits the encoded OCLLIST instance to the receiving application's communications layer. Although there are many methods representing this byte data IETF RFC 1014 is used for transmission, in one embodiment, and in another embodiment, XDR (External Data Representation) is used. Further, the byte data may be transmitted using any platform independent protocol, (e.g. TCP/IP). Further, the byte data may be transmitted using IETF RFC1014. At step 370, the receiving communications layer receives the encoded OCLLIST instance. At step 380, in response to the communications layer receiving the encoded OCLLIST instance, the OCL layer decodes the OCLLIST instance. This effectively rebuilds the OCLLIST instance on the receiving OCL layer.

At step 390, in response to the arrival of the OCLLIST instance, the receiving application accesses data sent from the OCLLIST instance. This is accomplished by accessing the various OCLLISTITEM instances that the receiving application knows about and is interested in. The receiving application can ignore the other OCLLISTITEM instances. At step 392, the receiving application accesses the data from the OCLLISTITEM. At step 395, the receiving application determines whether it has accessed all the data it needs from the list. If all the data has not been accessed, then steps 390, 392, and 395 are repeated until all the data has been accessed. Thus, the receiving application receives the data from the sending application without the need to predefine the data types.

Note that although only one OCLLIST instance is being encoded and sent, it is within the scope of the present invention to generate a number of objects to be encoded and sent together. For example, two OCLLIST instances, an OCLMACADDR, some OCLINT instances and an OCLSYMBOL instance can all be encoded together and sent. This will be explained in more detail in relationship to encoding.

The above method illustrates how an application sends information from one application to another application. It is possible to substitute step 310 with the first application received an OCLLIST instance from another application. The first application can then access, add, or remove, data from an OCLLIST instance. The first application can then transmit the OCLIST instance according to steps 350–395.

Encoding OCLVARS

Figure 4A:
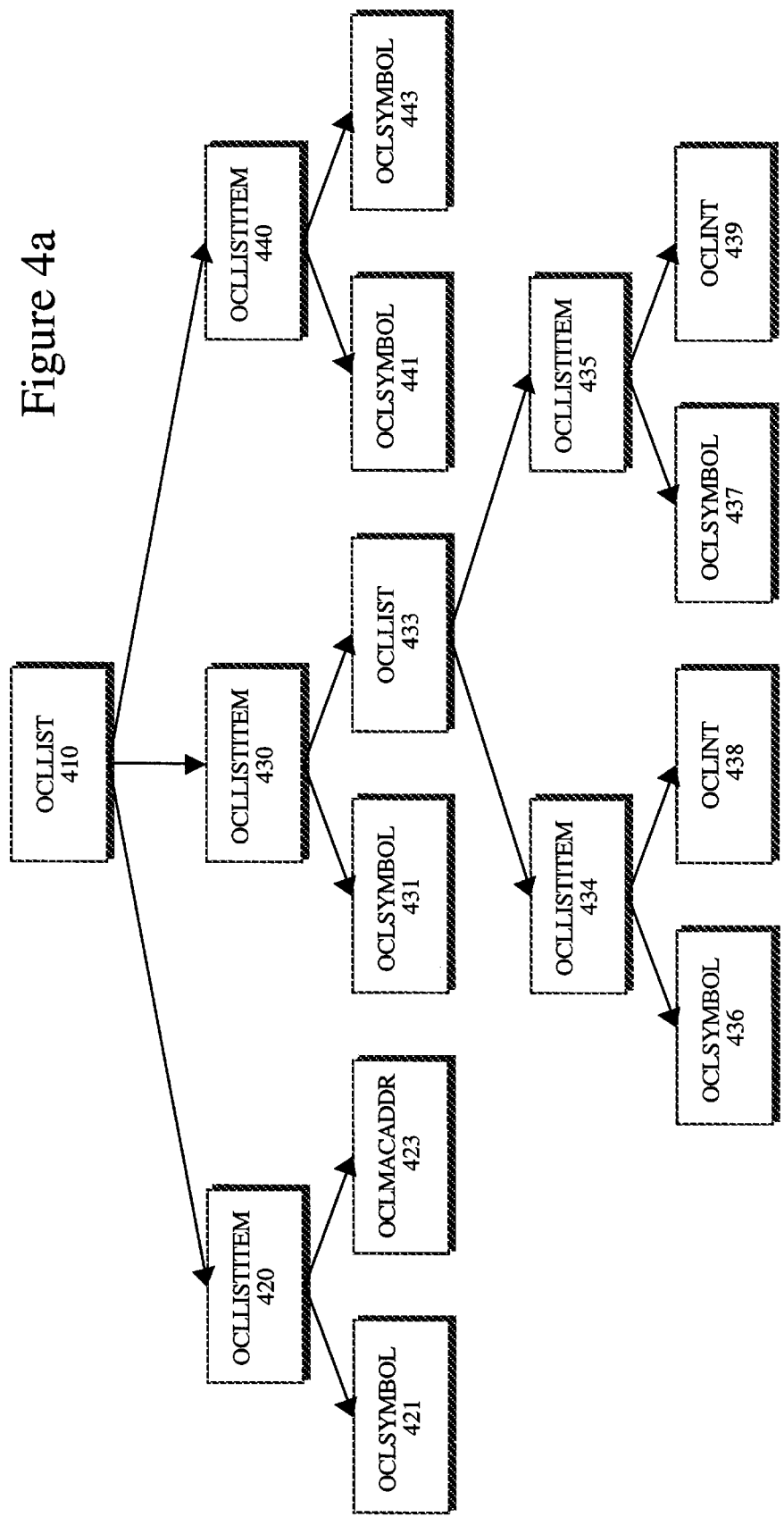
FIG. 4a illustrates an example of an OCLLIST instance.

FIG. 4a illustrates an example OCLLIST instance 410. This OCLLIST instance 410 will be used to illustrate the encoding of an OCLLIST instance. OCLLIST instance 410 includes three OCLLISTITEM instances, 420, 430, and 440.

OCLLISTITEM instance 420 includes OCLSYMBOL instance 421 and OCLMACADDR instance 423. OCLSYMBOL instance 421 contains a string representation of a symbol name, for example, "Sender MAC Address". OCLMACADDR instance 423 includes a string representation of a MAC address, for example, "ABCDEF123456".

OCLLISTITEM instance 430 includes an OCLSYMBOL instance 431 and an OCLLIST instance 433. OCLSYMBOL instance 431 includes a symbol name, for example, "ID List". OCLLIST instance 433 includes OCLLISTITEM instances 434 and 435. OCLLISTITEM instance 434 includes OCLSYMBOL instance 436, for example, "ID Number", and OCLINT instance 438, for example, 981654. OCLLISTITEM instance 435 includes OCLSYMBOL instance 437, for example, "ID Number", and OCLINT instance 439, for example 234923.

OCLLISTITEM instance 440 includes OCLSYMBOL instances 441 and 443. OCLSYMBOL instance 441 includes, for example, "Sender Name." OCLSYMBOL instance 443 includes, for example, "User 1."

Figure 4B:
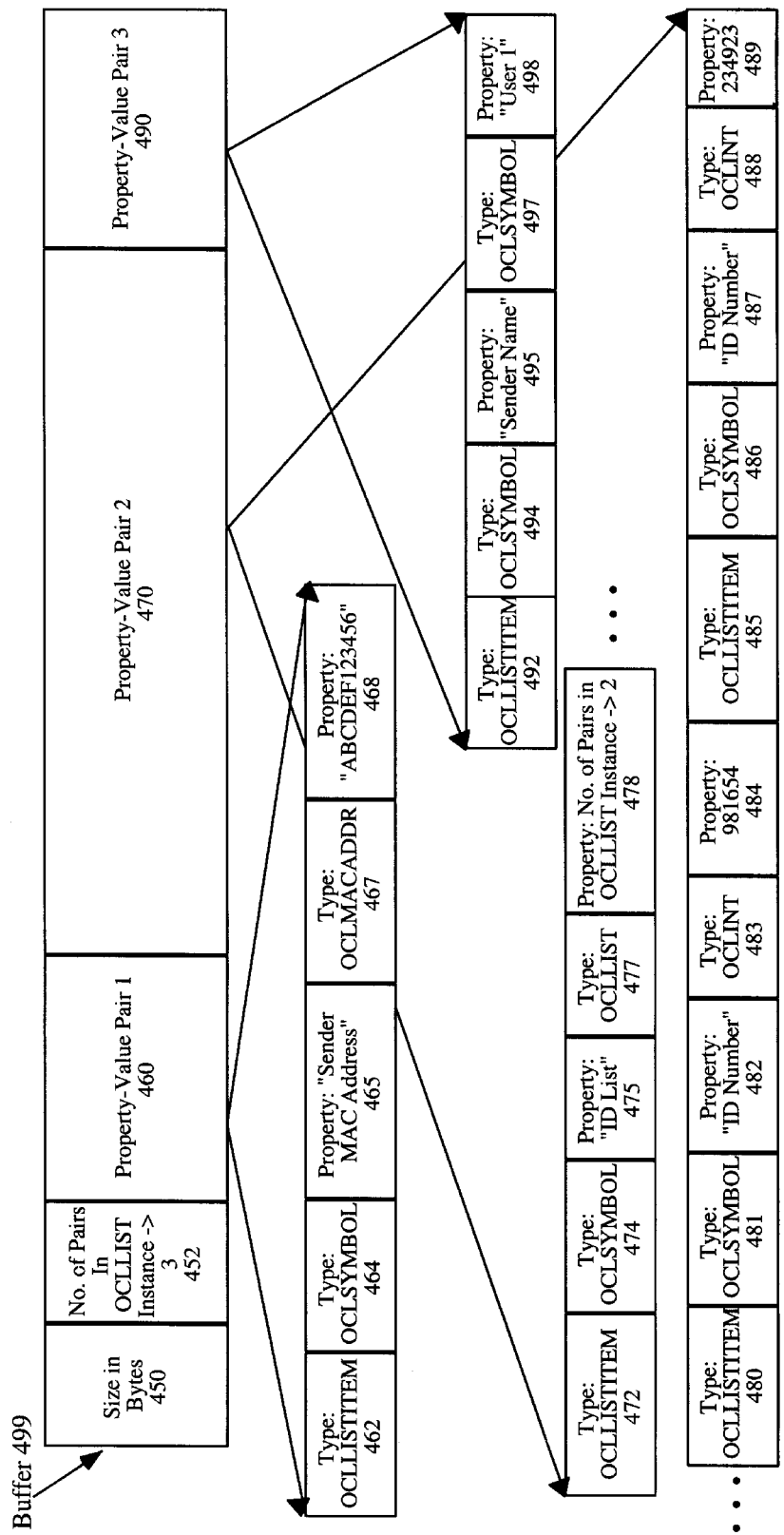
FIG. 4b illustrates the OCLLIST instance of FIG. 4a encoded.

FIG. 4b illustrates an encoded version of the OCLLIST instance 410 of FIG. 4a. Note that in one embodiment of the present invention, each object understands the message "encode". In response to receiving the message, an object will respond with a byte representation of itself. Thus, to encode OCLLIST instance 410, the OCL layer need only send the message, encode to OCLLIST instance 410. OCLLIST instance will create a byte representation of itself by also sending the message "encode", to all of its list objects (OCLLISTITEM instances 420, 430 and 440).

Buffer 499 represents an encoded version of the OCLLIST instance 410 of FIG. 4a. An OCL layer provides the bytes in buffer 499 to a communications layer. The communications layer can then transmit the bytes.

Bytes 450 represents the size, in bytes, of the encoded version of the OCLLIST instance 410 and any associated overhead stored within buffer 499. Immediately following the bytes 450, are bytes 452 indicating the number of pairs of property-values in the encoded OCLLIST instance 410 that follow. For this example, OCLLIST instance 410 includes three pairs: bytes 460 for property-value pair 1 represents OCLLISTITEM 420; bytes 470 for property-value pair 2 represents OCLLISTITEM 430, and bytes 490 for property-value pair 3 represents OCLLISTITEM 440.

A more detailed view of bytes 460, representing property-value pair 1, is shown as bytes 462, 464, 465, 467, and 468. Bytes 462 indicates that the property-value pair 1 is an OCLLISTITEM instance. Bytes 464 and 465, indicate that the property, for OCLLISTITEM instance 420, is defined as the OCLSYMBOL "Sender MAC Address". This corresponds to OCLSYMBOL instance 421. Note that the symbol has itself been defined as a property-value pair, bytes 464 and 465. This ensures that a receiving application will be able to access the symbol associated with a property without having to know beforehand how the symbol will be represented. The value for the property is represented as bytes 467 and 468. Bytes 467 indicate that the property in bytes 468 is represented as a OCLMACADDR. Again, this allows the receiving application to access the value without having to know beforehand that the value is a OCLMACADDR representation.

A more detailed view of bytes 470, representing the property-value pair 2, are shown as the bytes 472, 474, 475, 477, 478, 480, 481, 482, 483, 484, 485, 486, 487, 488, and 489. Bytes 472 indicate that an OCLLISTITEM instance is represented. Bytes 474 and 475 indicate that the property is the OCLSYMBOL "ID List". The value of bytes 477 and 478, indicate that an OCLLIST including two OCLLISTITEM instances follows. Bytes 480–484 describe OCLLISTITEM instance 434. Bytes 480 describe that a OCLLISTITEM follows. Bytes 481–482 define an OCLSYMBOL "ID Number". Bytes 483 indicate that the property for the symbol is represented as an integer. Bytes 484 include the integer value 918654. Bytes 485–489 similarly describe OCLLISTITEM instance 435.

A more detailed view of bytes 490, representing property-value pair 3, are shown as byte 492, 494, 495, 497 and 498. These bytes describing OCLLISTITEM instance 440 are similar to the bytes 460 of the property-value pair 1 which was previously described. Bytes 492 indicate that an OCLLIST ITEM follows. Bytes 494–495, the property for the OCLLISTITEM, represent a OCLSYMBOL "Sender Name". Bytes 497–498 represent the value corresponding with the "Sender Name" symbol. Bytes 497 indicate that an OCLSYMBOL string follows. Bytes 498 is the symbol string "User 1".

The use of symbols, in the encoding process, allows the receiving application to locate particular data in a received OCLLIST instance. Typically, this is done using a name match. For example, if the receiving application wanted to access the address of the sender, the receiving application would request a match for a symbol named "Sender MAC Address". Once the OCLLISTITEM instance located using the symbol, the property associated with that symbol can be accessed.

Another advantage of using symbols is that in some cases, the receiving application will not know what types of objects are in the OCLLIST, but the receiving application will have to perform some operation on each of those objects. The receiving application can still access each object, without knowing the types of the objects. For example, the receiving object can access the first object in the list and insert it into another list. It would not matter to the receiving application whether the first object was a OCLSYMBOL instance, an OCLINT instance, or some other instance.

Although the bytes 460, representing property-value pair 1, have been encoded first in the buffer 499, the present invention is not restricted in the ordering of the pairs in the list. For example, the bytes 470, representing property value pair 2, could have encoded into the buffer ahead of bytes 460. Because a name match is performed by using the information in each symbol, a receiving application can access and modify a received list without the need to know about the order of the objects.

A Network Using Object Control Language (OCL)

Figure 5:
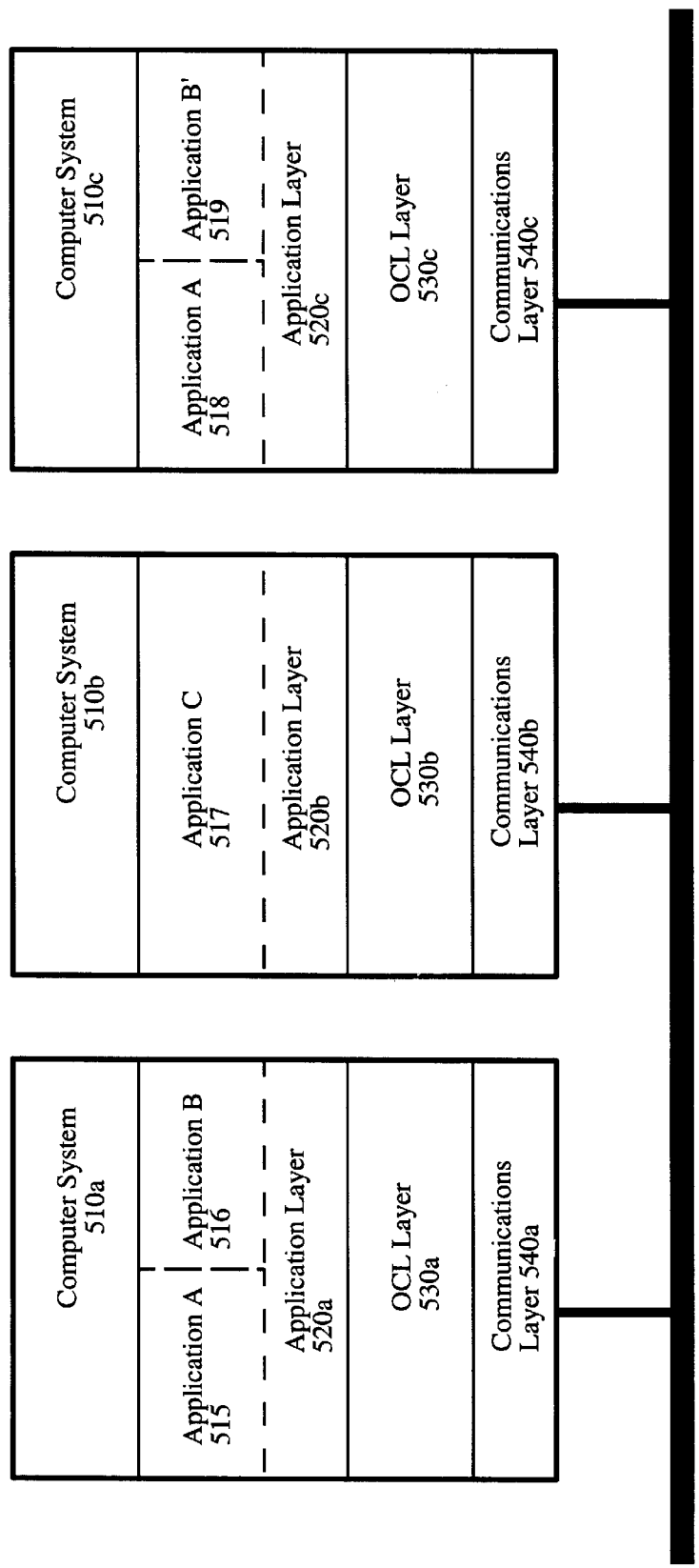
FIG. 5 illustrates a network upon which the present invention can be implemented.

As mentioned previously, what is desired is a data model capable of simple inter-application data transfer without requiring the predefinition of data types, templates or transport mechanisms used in the data transfer. FIG. 5 illustrates a network upon which OCL can be implemented to achieve this goal.

Three computer systems 510*a*, 510*b*, and 510*c* are each coupled to a network medium 550. This medium is typically cable but can also be radio communications, light, or some other communications medium. Each computer system includes three main logical layers: the communications layer 540*a–c*, the OCL layer 530*a–c*, and the applications layer 520*a–c*. The communications layer is responsible for providing the basic communications features for the computer system. In one embodiment, the communications layer can communicate to other nodes, or other applications, using XDR and the TCP/IP communications protocol. The OCL layer provides OCL functions for other applications and accesses the communications layer. The application layer allows applications to run on computer system 510*a*. Each application can support the execution of a number of applications. For example, computer system 510*a* and computer system 510*c* are both executing two applications.

In this example, computer system 5 10*a* executes application A 515 and application B 516. Application A 515 and application B 516 are different applications. Computer system 510*b* executes application C 517. Application C 517 is not the same application as either application A 515 or application B 516. Computer system 510*c* executes application A 518 and application B'519. Application A 518 runs the same source code as application A 515. Application B'519 runs an older version of the source code for application B 516. Oftentimes a number of versions of an application will be executing on different systems in the network. All these applications have a desire to share information.

The following example illustrates communicating data between two applications. In these examples, no predefinition of data types and data structures need be performed. Assume that application A 515 wants to send data to application B 516. According to the method illustrated in FIG. 3, A 515 prepares all the data it wishes to transmit to B 516. For example, A 515 may want to send all the information it knows about regarding a particular network port. A 515 generates a port object, an instance of a new subclass of OCLVAR, that all the applications in the present system know about. The port object includes a port number object, a slot number object, a management address object, and a chassis ID object. These can all be represented by OCLINT instances. The port object can be added to an OCLLIST instance as an OCLLISTITEM instance. A 515 requests the OCL layer to transmit the information to B 516.

Two solutions exist at this point. In one embodiment, the OCL layer 530*a* directly transmits the information to B 515 without encoding the OCLLIST instance. In the second embodiment, the OCLLIST instance is encoded by the OCL layer 530*a*, and the encoded bytes are then passed onto the communications layer 540*a*. The communications layer 540*a* determines that B 516 is executing on computer system 510*a*. The communications layer 540*a* provides the encoded bytes to OCL layer 530*a*. OCL layer 530*a* then provides the OCLLISTITEM instance to B 516. In this example, assume that B 516 only needs the slot number data. B 516 would access the port object, from the OCLLIST instance, using a symbol match. B 516 would then request that the port object return, using a second symbol match, the slot number. For the purposes of example, assume that B 516 represents slot numbers internally as strings. B 516 would request the slot number object to provide a string representation of itself from the OCL layer 540*a*. Because symbols are used, OCL layer 540*a* knows that the port object's data is encoded as an OCLINT instance. The OCL layer 540*a* can then apply an integer to string conversion, to provide B 516 with its desired slot number format.

Thus, A 515 can simply and easily communicate data with B 516 without the need for prior definition of the data types. A 515 and B 516 need only have the same symbol names of the data they wish to share. The internal representation of the receiving applications need not be known by the sending application. Further, the receiving application need not know the sending application's internal representation of the data, nor need it know the OCL representation of the data.

OCL allows two applications to communicate data irrespective of the platform they are executing on. For example, computer system 510a could be a Apple Macintosh®, available from Apple Computer, Inc. of Cupertino, Calif., while computer system 510b could be a Sun workstation, available from Sun Microsystems. In one embodiment, each computer system need only implement XDR in its communications layer and support OCL.

Assume now that A 515 wants to share the port data with C 517. The steps are very similar to the second embodiment described for the communications between A 515 and B 516. The only difference is that the communications layer 540a must communicate the encoded data to communications layer 540b. Communications layer 540b then transmits the information to OCL layer 530b. The OCL layer 530b provides C 517 with access to the decoded OCLLIST instance. C 517 accesses the information needed from the OCLLIST instance.

As mentioned previously, a network, having potentially thousands of applications executing on the various network nodes, can have many different versions of the same application executing on the nodes. The following illustrates how OCL can be used to allow new versions to share data with the older versions without having to modify the older applications.

Assume that B 516 wishes to share port information with the older version B'519. Assume also that the following differences exist between the applications: B'519 represents slot numbers as integers, and B'519 was written before chassis IDs were included in port objects (B'519 does not understand chassis ID objects). The steps followed are similar to those for communicating between A 515 and C 517. The important differences lie in what B'519 does with the information. B 516 prepares the port object for sending, the OCL layer 530a aids in the encoding of the OCLLIST instance and the communications layer 540a transmits the encoded bytes to communications layer 540c. Communications layer 540c receives the bytes and provides them to OCL layer 530c. OCL layer 530c recreates the OCLLIST instance. Application B'519 accesses the port object contained in the OCLLIST instance. Application B'519 accesses the port object, the slot number object, and the management address object. Application B'519 does not necessarily return an error because an additional object is included in the port object (the chassis ID object). Rather B'519 uses the data that it needs. Application B'519 need not know the internal representation of the slot number object to access the data in that object. Application B'519 requests the OCL layer 530c to provide the slot number data in integer format.

OCL also allows a number of applications to share the same data. This is particularly useful where, for example, a first application transmits information to a second application, and then the second application transmits that same information to a third application.

Assume that B 516 transmits the port object data to B'519, as described above. Assume further that B'519 then needs to transmit the port information to C 517. B'519 causes the OCLLIST instance to be created and adds the port object, received from B 516, to the OCLLIST instance. Note that the chassis ID object is still contained in the port object. B'519 ignored the chassis ID object while it was accessing the port object. B'519 then causes the OCLLIST instance to be encoded and transmitted through the OCL layer 530c and the communications layer 540c. Communications layer 540c decodes the received encoded bytes. OCL layer 540c then generates the OCLLIST instance. C 517 accesses the port object from the OCLLIST instance. C 517 can also access the chassis ID information from the port object. Note that B'519 did not negatively affect the port object data. Using OCL, B'519 was able to access the information it needed from the port object and then pass on the port object to C 517. This occurred even though B'519 did not know that the port object contained the chassis ID object.

A method and apparatus for easily communicating information has been described.

What is claimed is:

1. A method of communicating a first data and second data from a first application to a second application being configured to accept only the first data, the method comprising:

generating a first object control language (OCL) instance including the first data;

generating a second OCL instance including the second data;

generating a list object;

generating a first list item including a first symbol and the first OCL instance;

generating a second list item including a second symbol and the second OCL instance;

including the first and second list items in the list object;

encoding the list object;

communicating the encoded list object from the first application to the second application;

decoding the encoded list object;

accessing the first list item from the list object using the first symbol; and ignoring the second object by the second application, the second object being unknown to the second application.

2. A method of communicating object oriented data between concurrently executing computer application programs, comprising:

a. creating at a first computer application program a list object comprising a plurality of data objects using an object control language (OCL) library;

b. encoding at a first computer communication program the list object to create an encoded list object, comprising encoding each data object in the plurality of data objects to create a plurality of encoded data objects, wherein encoding each data object comprises prepending a type object to each data object to indicate the type of data object;

c. causing the encoded list object to be communicated from the first computer communication program to a second computer communication program;

d. decoding at the second computer communication program the encoded list object to recover the list object comprising the plurality of data objects; and e. accessing at a second computer application program one of the plurality of data objects of the list object.

3. The method of the claim 2, wherein encoding at a first computer communication program the list object to create an encoded list object further comprises:

a. maintaining a count of the plurality of encoded data objects; and b. maintaining a count of the size of the plurality of encoded data objects.

4. The method of claim 3, wherein encoding each data object in the plurality of data objects to create a plurality of encoded data objects further comprises associating an identifier object with the data object to identify the data object.

5. The method of claim 4, wherein encoding each data object in the plurality of data objects to create a plurality of encoded data objects further comprises prepending a type object to the identifier object associated with the data object to indicate a type of object which follows is the identifier object.

6. The method of claim 5, wherein the causing of the encoded list object to be communicated from the first computer application program to a second computer application program comprises:

a. communicating the count of the size of the plurality of encoded data objects to the second computer communication program;

b. communicating the count of the plurality of encoded data objects to the second computer communication program; and c. communicating the plurality of encoded data objects to the second computer communication program.

7. The method of claim 6, wherein the communicating of the plurality of encoded data objects to the second computer communication program further comprises:

a. communicating to the second computer communication program the type object prepending the identifier object associated with the data object;

b. communicating to the second computer communication program the identifier object associated with the data object;

c. communicating to the second computer communication program the type object prepending the data object; and d. communicating to the second computer communication program the data object.

8. The method of claim 7, wherein the decoding at the second computer communication program the encoded list object to recover the list object comprising the plurality of data objects, further comprises:

a. detecting the count of the size of the plurality of encoded data objects;

b. detecting the count of the plurality of encoded data objects; and c. decoding each encoded data object in the plurality of encoded data objects to recover the plurality of data objects.

9. The method of claim 8, wherein the decoding each encoded data object in the plurality of encoded data objects to recover the plurality of data objects further comprises:

a. reading the type object prepending the identifier object associated with the data object to determine the type of object which follows is the identifier object;

b. reading the identifier object associated with the data object to identify the data object; and c. reading the type object prepending the data object to determine the type of object for the data object which follows.

10. The method of claim 9, wherein the first computer application program and second computer application program are concurrently executing on a same computer and the first computer communication program and the second computer communication program are the same.

11. The method of claim 9, wherein the first computer application program and the first computer communication program are concurrently executing on a first computer and the second computer application program and the second computer communication program are concurrently executing on a second computer and wherein the first computer is coupled in communication with the second computer.

12. A method of communicating object oriented data between a plurality of concurrently executing computer application programs, comprising:

a. creating at a first computer application program a first list object comprising a plurality of first data objects using a first object control language (OCL) library;

b. encoding at a first computer communication program the first list object to create an encoded first list object, comprising encoding each first data object in the plurality of first data objects to create a plurality of encoded first data objects, wherein encoding each first data object comprises prepending a type object to each first data object to indicate the type of first data object;

c. causing the encoded first list object to be communicated from the first computer communication program to a second computer communication program;

d. decoding at the second computer communication program the encoded first list object to recover the first list object;

e. accessing at a second computer application program one of the plurality of first data objects of the first list object;

f. creating at the second computer application program a second list object comprising at least one of the plurality of first data objects and a second data object using a second object control language (OCL) library;

g. encoding at the second computer communication program the second list object to create an encoded second list object;

h. causing the encoded second list object to be communicated from the second computer communication program to a third computer communication program;

i. decoding at the third computer communication program the encoded second list object to recover the second list object comprising the at least one of the plurality of first data objects and the second data object; and j. accessing at a third computer application program either the at least one of the plurality of first data objects or the second data object.

13. A method of communicating object oriented data between concurrently executing computer application programs, comprising:

a. receiving at a first computer communication program an encoded first list object comprising a plurality of first data objects;

b. decoding at the first computer communication program the encoded first list object to recover a first list object;

c. accessing at a first computer application program at least one of the plurality of first data objects of the encoded first list object;

d. creating at the first computer application program a second list object comprising the plurality of first data objects and a second data object using a first object control language (OCL) library;

e. encoding at the first computer communication program the second list object to create an encoded second list object, the encoded second list object including a plurality of encoded first data objects and an encoded second data object, wherein encoding the plurality of first data objects and a second data object comprises prepending a type object to the plurality of first data objects and a second data object to indicate the type of data object;

f. causing the encoded second list object to be communicated from the first computer communication program to a second computer communication program;

g. decoding at the second computer communication program the encoded second list object to recover the second list object; and h. accessing at a second computer application program at least one of the plurality of first data objects or the second data object.

14. A method of communicating object oriented data between a plurality of concurrently executing computer programs, comprising:

receiving an encoded list object by a first application, the encoded list object including (i) a first list item including a first symbol and a first object control language (OCL) instance, and (ii) a second list item including a second symbol and a second OCL instance;

decoding the encoded list object;

accessing the first list item from the list object using the first symbol; and ignoring the second list item when the second list item is unknown to the first application.

15. A method comprising:

generating a list object including a plurality of list items by a first application, one of the plurality of list items includes a first symbol and a first object control language (OCL) instance; and encoding the list object; and providing the encoded list object to a second application to allow the first application to exchange information with the second application, without prior definition of a data type associated with the first OCL instance as placed in the first symbol.

16. The method of claim 15, wherein the first application is a different version of software than the second application.

17. The method of claim 15 further comprising providing the encoded list object to the second application to allow the first application to exchange information with the second application, without prior definition of a transport mechanism.

18. A method of communicating data between a plurality of applications, the method comprising:

encoding a list including an OCLIST, said list including a first set of data objects, each of said data objects including data to be communicated;

transmitting said encoded list to a first of said plurality of applications;

decoding said encoded list for said first application, and exchanging data type information between said first application and a second of said plurality of applications after performing the following steps, said first application accessing a first subset of data objects from said list, said first subset not including all data objects in said first set, generating a second encoded list, said second encoded list corresponding to said list, said first application causing said second encoded list to be transmitted to said second application, decoding said second encoded list for said second application, and said second application accessing a second subset of data objects corresponding to said list, said second subset not including all the data objects in said first subset.

19. A method of communicating data between a plurality of applications, the method comprising:

encoding a list, said list including a first set of data objects, each of said data objects including data to be communicated;

transmitting said encoded list to a first of said plurality of applications;

decoding said encoded list for said first application, and exchanging data type information between said first application and a second of said plurality of applications after performing the following steps, said first application accessing a first subset of data objects from said list, each data object including an OCLSYMBOL and an OCLVAR, said first subset not including all data objects in said first set, generating a second encoded list, said second encoded list corresponding to said list, said first application causing said second encoded list to be transmitted to said second application, decoding said second encoded list for said second application, and said second application accessing a second subset of data objects corresponding to said list, said second subset not including all the data objects in said first subset.

20. A method of communicating data between a plurality of applications, said data included in objects, said method comprising:

receiving an unknown set of objects without prior runtime negotiation of known sets of objects, said unknown set of objects includes an OCLLIST;

accessing a first known subset of objects from said unknown set of objects, responsive to a first application of said plurality of applications;

transmitting said unknown set of objects, responsive to said first application;

receiving said unknown set of objects responsive to a second application of said plurality of applications, and accessing a second known subset of objects from said unknown set, said second subset including an object not included in said first subset.

21. The method of claim 20 wherein each said object includes an OCLSYMBOL and an OCLVAR.

22. The method of claim 21 wherein said first application is an earlier version of said second application.

23. A method of communicating data between a first application executing on a first computer, a second application executing on a second computer, and a third application executing on a third computer, said first and second applications being in communication, said second and third applications being in communication, the method comprising:

defining a first set of objects for which said first application is responsive, said first set including a first object and a second object;

defining a second set of objects for which said second application is responsive, said second set including said first object but not including said second object;

defining a third set of objects for said third application, said third set including said first object and said second object;

without prior runtime negotiation of object sets between said first, second, and third applications, generating a first list including said first object, said second object, and an OCLLIST instance;

transmitting said first list to said second application, responsive to said first application, responsive to said first application;

said second application accessing said first object from said first list, responsive to said second application receiving said first list;

transmitting said first list to said third application, responsive to said second application, and accessing said second object from said second list, responsive to said third application receiving said second list.

24. The method of claim 23 wherein said each object includes an OCLSYMBOL instance and an OCLVAR subclass instance.

25. The method of claim 24 wherein said first application is an earlier version of said second application.

26. An apparatus for communicating information among a plurality of applications, said apparatus comprising:
a first computer system for executing a first application, said first computer system for generating a first list of objects responsive to said first application, said first list including an OCLLIST instance, said first computer system for encoding and transmitting said first list;
a second computer system for executing a second application, said second computer system for receiving and decoding said first list in response thereto, said first list being unknown to said second application, said first list including a first object and a second object, said first object being known to said second application, said second object being unknown to said second application, said computer system for extracting said first object from said first list, said second computer system for transmitting said first list;
a third computer system for executing a third application, said third computer system for receiving said first list, said first list being unknown to said third application, said second object being known to said third application, said third application for extracting said second object from said first list, and
a transmission medium coupling said first, second, and third computer systems.

27. The apparatus of claim 26 wherein said first object includes an OCLSYMBOL instance and an instance of an OCLVAR subclass.

28. The apparatus of claim 27 wherein said first application is a later version of said second application.

29. The apparatus of claim 28 wherein said first application is the same version as said third application.

30. The apparatus of claim 29 wherein said second computer system is further for generating and adding a third object to said list prior to transmitting said list.

31. A computer data signal embodied in a bit stream for communicating data between computer application programs comprising:
at least one size byte indicating the number of bytes to be transmitted between computer application programs;
at least one pair number byte indicating the number of property-value pairs to be transmitted between computer application programs; and
one or more bytes representing at least one property-value pair formed by a first computer application program using an object control language (OCL) library to communicate data to a second computer application program.

32. The computer data signal of claim 31 wherein the at least one property-value pair includes,
a property of the at least one property value pair; and
a value for the property of the at least one property-value pair.

33. The computer data signal of claim 31 wherein the bit stream is communicated over network media.

34. The computer data signal of claim 32 wherein the at least one property-value pair further includes,
an OCL data class type indicating the type of OCL data class to which the at least one property-value pair belongs.

35. The computer data signal of claim 33 wherein the network media is one of the set of cable, wireless carrier waves, and optical fiber.

36. The computer data signal of claim 34 wherein the at least one property-value pair further includes,
an OCL data sub-class type indicating the type of OCL data sub-class to which the at least one property-value pair belongs.

37. A computer network to communicate data between computer application programs, comprising:
a first computer coupled to a network media operating a first application program and a data communications model;
a second computer coupled to the network media operating a second application program and the data communications model; and
the data communications model providing inter-application data transfer, the data communications model including an applications layer having an object control language (OCL) library, the applications layer determining the data communicated between computer application programs, generating data objects of the data for transmission, and degenerating data objects into data for reception, an OCL layer to determine the method of transceiving the data objects, and a communications layer coupled to the network, media for transceiving the data objects between computer application programs.

38. The computer network of claim 37 wherein the OCL layer determines whether or not to encode the data objects prior to transmission and whether or not to decode the received data objects prior to receipt by the application layer.

39. The computer network of claim 37 wherein the first computer operates a third application program and the communications layer determines whether the data objects should be transceived over the network media between the first application program and the second application program or the data objects should be transceived within the first computer between the first application program and the third application program.

40. The computer network of claim 37 wherein the network media is one of the set of cable, wireless carrier waves, and optical fiber.

41. A computer program product for communicating data between computer program applications, comprising:
a computer readable storage medium; and
code recorded in the computer readable storage medium including
an object control language (OCL) library to provide at least one OCL object in response to a computer program application,
code to determine if all data to be communicated between applications has been included in the at least one OCL object,
code to encode the at least one OCL object for transmission, and
code to transmit an encoded at least one OCL object between computer program applications.

42. The computer program product of claim 41 for communicating data between computer program applications, wherein the code recorded in the computer readable storage medium further includes code to decode an encoded OCL object for reception.

43. The computer program product of claim 41 for communicating data between computer program applications, wherein the computer readable storage medium is one or more of the set of magnetic storage medium, optical storage medium, or semiconductor storage medium.

* * * * *